United States Patent
Waldo et al.

(10) Patent No.: US 6,243,716 B1
(45) Date of Patent: *Jun. 5, 2001

(54) METHODS AND SYSTEMS FOR DISTRIBUTED FAILURE DETECTION AND RECOVERY USING LEASING

(75) Inventors: James H. Waldo, Dracut; Ann M. Wollrath, Groton; Robert Scheifler, Somerville; Kenneth C. R. C. Arnold, Lexington, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,491

(22) Filed: Aug. 20, 1999

Related U.S. Application Data

(60) Division of application No. 09/044,916, filed on Mar. 20, 1998, now Pat. No. 6,016,500, which is a continuation-in-part of application No. 08/729,421, filed on Oct. 11, 1996, now Pat. No. 5,832,529.

(51) Int. Cl.[7] .................................................. G06F 15/00
(52) U.S. Cl. ........................ 707/202; 707/10; 707/206; 709/203; 709/219; 709/224; 709/229
(58) Field of Search .............................. 707/10, 202, 206, 707/204, 9; 709/203, 219, 224, 229

(56) References Cited

U.S. PATENT DOCUMENTS

| 4,491,946 | 1/1985 | Kryskow, Jr. et al. ................. 370/89 |
| 4,713,806 | 12/1987 | Oberlander et al. .................... 370/58 |
| 4,809,160 | 2/1989 | Mahon et al. ......................... 364/200 |
| 4,823,122 | 4/1989 | Mann et al. ..................... 340/825.28 |
| 4,939,638 | 7/1990 | Stephenson et al. ................ 364/200 |

(List continued on next page.)

FOREIGN PATENT DOCUMENTS

| 0 300 516 | 1/1989 | (EP) . |
| 0 351 536 | 1/1990 | (EP) . |
| 0 384 339 | 8/1990 | (EP) . |
| 0 427 874 | 3/1992 | (EP) . |
| 0 474 340 | 3/1992 | (EP) . |

(List continued on next page.)

OTHER PUBLICATIONS

Mullender, *Distributed Systems*, Second Edition, Addison–Wesley, 1993.

Howard et al., *Scale and Performance in a Distributed File System*, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, *Self–stabilizing Systems in Spite of Distributed Control*, Communications of the ACM, vol. 17, No. 11, Nov. 1974, pp. 643–644.

Ousterhout et al., *The Sprite Network Operating System*, Computer, IEEE, Feb. 1988, pp. 23–36.

(List continued on next page.)

*Primary Examiner*—Jean R. Homere
(74) *Attorney, Agent, or Firm*—Finnegan, Henderson, Farabow, Garrett & Dunner, L.L.P.

(57) ABSTRACT

A system for using a lease to detect a failure and to perform failure recovery is provided. In using this system, a client requests a lease from a server to utilize a resource managed by the server for a period of time. Responsive to the request, the server grants the lease, and the client continually requests renewal of the lease. If the client fails to renew the lease, the server detects that an error has occurred to the client. Similarly, if the server fails to respond to a renew request, the client detects that an error has occurred to the server. As part of the lease establishment, the client and server exchange failure-recovery routines that each invokes if the other experiences a failure.

50 Claims, 11 Drawing Sheets

U.S. PATENT DOCUMENTS

| | | | |
|---|---|---|---|
| 4,956,773 | 9/1990 | Saito et al. | 364/200 |
| 5,088,036 | 2/1992 | Ellis et al. | 395/425 |
| 5,109,486 | 4/1992 | Seymour | 395/200 |
| 5,187,787 | 2/1993 | Skeen et al. | 395/600 |
| 5,218,699 | 6/1993 | Brandle et al. | 395/650 |
| 5,257,369 | 10/1993 | Skeen et al. | 395/650 |
| 5,293,614 | 3/1994 | Ferguson et al. | 395/600 |
| 5,297,283 | 3/1994 | Kelly, Jr. et al. | 395/650 |
| 5,311,591 | 5/1994 | Fischer | 380/4 |
| 5,386,568 | 1/1995 | Wold et al. | 395/700 |
| 5,390,328 | 2/1995 | Frey et al. | 395/650 |
| 5,399,435 | 3/1995 | Lubkin et al. | 395/700 |
| 5,423,042 | 6/1995 | Jalili et al. | 395/700 |
| 5,440,744 | 8/1995 | Jacobson et al. | 395/650 |
| 5,448,740 | 9/1995 | Kiri et al. | 395/700 |
| 5,452,459 | 9/1995 | Drury et al. | 395/700 |
| 5,455,952 | 10/1995 | Gjovaag | 395/700 |
| 5,471,629 | 11/1995 | Risch | 395/800 |
| 5,475,792 | 12/1995 | Stanford et al. | 395/2.42 |
| 5,475,817 | 12/1995 | Waldo et al. | 393/650 |
| 5,481,721 | 1/1996 | Serlet et al. | 395/700 |
| 5,504,921 | 4/1996 | Dev et al. | 395/800 |
| 5,511,197 | 4/1996 | Hill et al. | 395/700 |
| 5,524,244 | 6/1996 | Robinson et al. | 395/700 |
| 5,553,282 | 9/1996 | Parrish et al. | 395/600 |
| 5,555,367 | 9/1996 | Premerlanl et al. | 395/161 |
| 5,557,798 | 9/1996 | Skeen et al. | 395/650 |
| 5,560,003 | 9/1996 | Nilsen et al. | 395/600 |
| 5,561,785 | 10/1996 | Blandy et al. | 395/497.01 |
| 5,577,231 | 11/1996 | Scalzi et al. | 395/500 |
| 5,603,031 | 2/1997 | White et al. | 395/683 |
| 5,617,537 | 4/1997 | Yamada et al. | 395/200.01 |
| 5,628,005 | 5/1997 | Hurvig | 395/608 |
| 5,640,564 | 6/1997 | Hamilton et al. | 395/683 |
| 5,644,768 | 7/1997 | Periwal et al. | 395/672 |
| 5,652,888 | 7/1997 | Burgess | 395/683 |
| 5,655,148 | 8/1997 | Richman et al. | 395/828 |
| 5,659,751 | 8/1997 | Heninger | 395/685 |
| 5,671,225 | 9/1997 | Hooper et al. | 370/468 |
| 5,675,796 | 10/1997 | Hodges et al. | 395/670 |
| 5,680,573 | 10/1997 | Rubin et al. | 395/456 |
| 5,680,617 | 10/1997 | Gough et al. | 395/615 |
| 5,684,955 | 11/1997 | Meyer et al. | 395/200.03 |
| 5,689,709 | 11/1997 | Corbett et al. | 395/683 |
| 5,706,435 | 1/1998 | Barbara et al. | 395/200.09 |
| 5,724,588 | 3/1998 | Hill et al. | 395/684 |
| 5,727,145 | 3/1998 | Nessett et al. | 395/186 |
| 5,737,607 | 4/1998 | Hamilton et al. | 395/701 |
| 5,745,678 | 4/1998 | Herzberg et al. | 395/186 |
| 5,745,703 | 4/1998 | Cetjin et al. | 395/200.68 |
| 5,754,849 | 5/1998 | Dyer et al. | 395/612 |
| 5,757,925 | 5/1998 | Faybishenko | 380/49 |
| 5,761,656 | 6/1998 | Ben-Shachar | 707/4 |
| 5,764,897 | 6/1998 | Khalidi | 395/200.31 |
| 5,768,532 | 6/1998 | Megerian | 395/200.75 |
| 5,774,551 | 6/1998 | Wu et al. | 380/25 |
| 5,778,228 | 7/1998 | Wei | 395/684 |
| 5,778,368 | 7/1998 | Hogan et al. | 707/10 |
| 5,787,425 | 7/1998 | Bigus | 707/6 |
| 5,787,431 | 7/1998 | Shaughnessy | 707/100 |
| 5,790,548 | 8/1998 | Sistanizadeh et al. | 370/401 |
| 5,809,507 | 9/1998 | Cavanaugh, III | 707/103 |
| 5,812,819 * | 9/1998 | Rodwin et al. | 395/500.44 |
| 5,813,013 | 9/1998 | Shaklb et al. | 707/102 |
| 5,815,149 | 9/1998 | Mutschler, III et al. | 345/335 |
| 5,815,709 | 9/1998 | Waldo et al. | 395/683 |
| 5,815,711 | 9/1998 | Sakamoto et al. | 395/701 |
| 5,829,022 | 10/1998 | Watanabe et al. | 711/118 |
| 5,832,529 | 11/1998 | Wollrath et al. | 707/206 |
| 5,835,737 | 11/1998 | Sand et al. | 395/293 |
| 5,842,018 | 11/1998 | Atkinson et al. | 395/700 |
| 5,844,553 | 12/1998 | Hao et al. | 345/329 |
| 5,845,129 | 12/1998 | Wendorf et al. | 395/726 |
| 5,860,004 | 1/1999 | Fowlow et al. | 395/701 |
| 5,860,153 | 1/1999 | Matena et al. | 711/216 |
| 5,864,862 | 1/1999 | Kriens et al. | 707/103 |
| 5,864,866 | 1/1999 | Henckel et al. | 707/103 |
| 5,872,928 | 2/1999 | Lewis et al. | 395/200.52 |
| 5,875,335 | 2/1999 | Beard | 395/705 |
| 5,878,411 | 3/1999 | Borroughs et al. | 707/4 |
| 5,884,024 * | 3/1999 | Lim et al. | 713/201 |
| 5,884,079 | 3/1999 | Furusawa | 395/701 |
| 5,887,134 | 3/1999 | Ebrahim | 395/200.3 |
| 5,889,951 * | 3/1999 | Lombardi | 709/219 |
| 5,890,158 | 3/1999 | House et al. | 707/10 |
| 5,892,904 | 4/1999 | Atkinson et al. | 395/187.01 |
| 5,933,497 | 8/1999 | Beetcher et al. | 380/4 |
| 5,935,249 | 8/1999 | Stem et al. | 713/201 |
| 5,940,827 | 8/1999 | Hapner et al. | 707/8 |
| 5,946,485 | 8/1999 | Weeren et al. | 395/703 |
| 5,946,694 | 8/1999 | Copeland et al. | 707/103 |
| 5,966,531 | 10/1999 | Skeen et al. | 395/683 |
| 6,003,763 | 12/1999 | Gallagher et al. | 235/379 |
| 6,009,103 | 12/1999 | Woundy | 370/401 |
| 6,061,699 | 5/2000 | DiCecco et al. | 707/513 |
| 6,061,713 | 5/2000 | Bharadhwaj | 709/203 |

FOREIGN PATENT DOCUMENTS

| | | | |
|---|---|---|---|
| 497 022 A1 | 8/1992 | (EP) . | |
| 0 555 997 | 8/1993 | (EP) . | |
| 0 565 849 | 10/1993 | (EP) . | |
| 0 569 195 | 11/1993 | (EP) . | |
| 0 625 750 | 11/1994 | (EP) . | |
| 0 635 792 | 1/1995 | (EP) . | |
| 0 651 328 | 5/1995 | (EP) . | |
| 0 660 231 | 6/1995 | (EP) . | |
| 0 697 655 | 2/1996 | (EP) . | |
| 0 718 761 | 6/1996 | (EP) . | |
| 0 767 432 | 4/1997 | (EP) . | |
| 0 778 520 | 6/1997 | (EP) . | |
| 0 794 493 | 9/1997 | (EP) . | |
| 0 803 810 | 10/1997 | (EP) . | |
| 0 803 811 | 10/1997 | (EP) . | |
| 0 805 393 | 11/1997 | (EP) . | |
| 0 810 524 | 12/1997 | (EP) . | |
| 0 817 020 | 1/1998 | (EP) . | |
| 0 817 022 | 1/1998 | (EP) . | |
| 0 817 025 | 1/1998 | (EP) . | |
| 0 836 140 A2 | 4/1998 | (EP) | G06F/9/46 |
| 2 253 079 | 8/1992 | (GB) . | |
| 2 262 825 | 6/1993 | (GB) . | |
| 2 305 087 | 3/1997 | (GB) . | |
| 11-45187 | 2/1999 | (JP) | G06F/9/46 |
| WO92/07335 | 4/1992 | (WO) . | |
| WO92/09948 | 6/1992 | (WO) . | |
| WO93/25962 A1 | 12/1993 | (WO) . | |
| WO94/03855 | 2/1994 | (WO) . | |
| WO96/03692 | 2/1996 | (WO) . | |
| WO96/10787 | 4/1996 | (WO) . | |
| WO96/18947 | 6/1996 | (WO) . | |
| WO96/24099 | 8/1996 | (WO) . | |
| WO98/02814 | 1/1998 | (WO) . | |
| WO98/04971 | 2/1998 | (WO) . | |

OTHER PUBLICATIONS

Dourish, *A Divergence–Based Model of Synchrony and Distribution in Collaborative Systems*, Xerox Technical Report EPC–1194–102, 1994, pp. 1–10.

Sharrott et al., *ObjectMap: Integrating High Performance Resources into a Distributed Object–oriented Environment*, ICODP, 1995.

Cannon et al., *Adding Fault–Tolerant Transaction Processing to Linda*, Software–Practice and Experience, vol. 24(5), May 1994, pp. 449–446.

Kambhatla et al., *Recovery with Limited Replay: Fault–Tolerant Processes in Linda*, Oregon Graduate Institute, Technical Report CSIE 90–019, Sep. 1990, pp. 1–16.

Anderson et al., *Persistent Linda: Linda+Transactions+Query Processing*, Proceedings of the 13th Symposium on Fault Tolerant Systems, 1994, pp. 93–109.

Gelernter, *Generative Communication in Linda*, ACM Transactions on Programming Languages and Systems, vol. 7, No. 1, Jan. 1985, pp. 80–112.

Carriero et al., *Distributed Data Structures in Linda*, Principals of Programming Language, 1986, pp. 1–16.

Pinakis, *Using Linda as the Basis of an Operating System Microkernel*, University of Western Australia, Department of Computer Science, Aug. 1993, pp. 1–165.

Linda Database Search, Jul. 20, 1995, pp. 1–68.

Carriero et al, *Distributed Data Structures in Linda*, Yale Research Report YALEU/DCS/RR–438, Nov. 1985.

Agha et al., *Actorspaces: An Open Distributed Progamming Paradigm*, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, p. 12.

Coulouris et al., *Distributed Systems Concepts and Designs*, Second Edition, Addison–Wesley, 1994.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Krasner, *The Smalltalk–80 Virtual Machine*, BYTE Publications Inc., Aug. 1991, pp. 300–320.

Birrell et al., *Network Objects*, DEC SRC Research Report 115, Feb. 28, 1994.

*Remote Method Invocation Specification*, Sun Microsystems, Inc., (1997), http://java.sun.com/products/jdk/1.1/docs/guide/rmi/spec/rmiTOC.doc.html.

Birrell, Andrew D. and Nelson, Bruce Jay, "Implementing Remote Procedure Calls, ACM Transactions on Computer Systems," vol. 2, No. 1, pp. 39–59, Feb. 1984.

Chung, Kin–Man and Yuen, Herbert, "A 'Tiny' Pascal Compiler: Part 1: The P–Code Interpreter," BYTE Publications, Inc., pp. 58–155, Sep. 1978.

Chun, Kin–Man and Yuen, Herbert, "A 'Tiny' Pascal Compiler: Part 2: The P–Compiler," BYTE Publications, Inc., pp. 34–52, Oct. 1978.

Thompson, Ken, "Regular Expression Search Algorithm," Programming Techniques, Communications of the ACM, vol. 11, No. 6, pp. 419–422, Jun., 1968.

Mitchell, James G., et al., "Mesa Language Manual," Xerox Corporation, Palo Alto Research Centers.

McDaniel, Gene, "An Analysis of a Mesa Instruction Set," Xerox Corporation, Palo Alto Research Center, May 1982.

Pier, Kenneth A., "A Retrospective on the Dorado, A High–Performance Personal Computer," Xerox Corporation, Palo Alto Research Centers, Aug. 1983.

Pier, Kenneth A., "A Retrospective on the Dorado, A High–Performance Personal Computer," Conference Proceedings, The 10th Annual International Symposium on Computer Architecture, Royal Institute of Technology, Stockholm, Sweden, 1983.

Gray, Cary G. and Cheriton, David R., "Leases: An Efficient Fault–Tolerant Mechanism for Distributed File Cache Consistency," Computer Science Department, Stanford University, 1989.

Birrell, Andrew, et al., "Network Objects," Digital Systems Research Center, Proceedings of the Fourteenth ACM Symposium on Operating Systems Principles, vol. 27, No. 5, pp. 217–230, Dec. 1993.

Chung, Kin–Man and Yuen, Herbert, "A 'Tiny' Pascal Compiler: The P–Code Interpreter," BYTE Publications, Inc., Sep. 1978.

Chung, Kin–Man and Yuen, Herbert, "A 'Tiny' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Pier, Kenneth A., "A Retrospective on the Dorando, A High–Performance Personal Computer," Xerox Corporation, Aug. 1983.

Pier, Kenneth A., "A Retrospective on the Dorando, A High–Performance Personal Computer," IEEE Conference Proceedings, The 10th Annual International Symposium on Computer Architecture, 1983.

Wilson, P.R., et al., "Design of the Opportunistic Garbage Collector," Proceedings of the Object Oriented Programming Systems Languages An Applications Conference, New Orleans, vol. 24, No. 10, Oct. 1989.

Jones, Richard, et al., "Garbage Collection: Algorithms for Automatic Dynamic Memory Management," John Wiley & Sons, 1996.

Birrell, Andrew, et al., "Distributed Garbage Collection for Network Objects," Digital Systems Research Center, No. 116, Dec. 15, 1993, pp. 1–18.

Gray, Cary G., Et al., "Leases An Efficient Fault–Tolerant Mechanism for Distributed File Cache Consistency," Computer Science Department, Stanford University, 1989, pp. 202–210.

Hamilton, Marc A., "Java and the Shift to net–Centric Computing," Computer, Aug. 1996, pp. 31–39.

Birrell, Andrew, et al., "Network Objects," Digital Equipment Corp. Systems Research Center Technical Report, 27(5), Dec. 1993, pp. 217–230.

Birrell et al., *Grapevine: An Exercise in Distributed Computing*, Communications of the ACM, vol. 25, No. 4, Apr. 1982, pp. 260–274.

*Transparent Network Computing*, Locus Computing Corporation, Jan. 5, 1995.

Lamport et al., *The Byzantine Generals Problem*, ACM Transactions on Programming Languages and Systems, vol. 4, No. 3, Jul. 1982, pp. 382–401.

Dolev et al., *On the Minimal Synchronism Needed for Distributed Consensus*, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Alexander et al., "Active Bridging," Proceedings of the ACM/SIGCOMM'97 Conference, Cannes, France, Sep. 1997.

"Change–Notification Service for Shared Files," IBM Technical Disclosure Bulletin, vol. 36, No. 8, pp. 77–82, XP002108713, New York, US, Aug. 1993.

"Resource Preemption for Priority Scheduling," IBM Technical Disclosure Bulletin, vol. 16, no. 6, p. 1931 XP002109435 New York, US, Nov. 1973.

Beech et al., "Object Databases as Generalizations of Relational Databases," Computer Standards & Interfaces, Vo 13, Nos. 1/3 pp. 221–230, Amsterdam, NL, Jan. 1991.

Bertino et al., "Object–Oriented Database Management Systems: Concepts and Issues," Computer, Vol. 24, No. 4, pp. 33–47, Los Alamitos, CA, Apr. 1991.

Betz, "Interoperable Objects: Laying the Foundation for Distributed Object Computing," Dr. Dobb's Journal, Vol. 19, No. 11, p. 18(13), Oct. 1994.

Bevan, "An Efficient Reference Counting Solution To The Distributed Garbage Collection Problem," Parallel Computing, NL, Elsevier Science Publishers, Amsterdam, Vol. 9, No. 2, pp. 179–192, Jan. 1989.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, Vol. 34, No. 10, pp. 34–48, Oct. 1, 1991.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, Vol. 6, No. 4, pp. 443–454, Jan. 1, 1987.

Gosling et al., "The Java (TM) Language Specification," Addison–Wesley, 1996.

Gottlob et al., "Extending Object–Oriented Systems with Roles," ACM Transactions On Information Systems, Vol. 14, No. 3, pp. 268–296, Jul. 1996.

Guth, "JaveOne: Sun to Expand Java Distributed Computing Effort," <http://www.sunworld.com/swol–02–1998/swo–02–sunspots.html>, XP–002109935, P.1, Feb. 20, 1998.

Hamilton et al., "Subcontract: A Flexible Base For Distributed Programming," Proceedings of 14th Symposium of Operating System Principles, Dec. 1993.

Hartman et al., "Liquid Software: A New Paradigm For Networked Systems," Technical Report 96–11, Department of Comp. Sci., Univ. of Arizona, Jun. 1996.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," Vol. 36, No. 09B, pp. 257–258, Sep. 1993.

IBM (TM) Technical Disclosure Bulletin, "Retrieval of Qualified Variables Using Extendible Hashing," Vol. 36, No. 12, pp. 301–303, Dec. 1993.

IBM, "Chapter 6—Distributed SOM (DSOM)," SOMobjects Developer Toolkit Users Guide, Version 2.1, pp. 6-1–6-90, Oct. 1994.

Jones et al., "Garbage Collection—Algorithms For Automatic Dynamic Memory Management," John Wiley & Sons, 1996.

Kay et al., "An Overview of the Raleigh Object–Oriented Database System," ICL Technical Journal, Vol. 7, No. 4, pp. 780–798, Oxford, GB, Nov. 1991.

Kougiouris et al., "Support for Space Efficient Object Invocation in Spring," Sep. 1994.

Lindholm et al., "The Java (TM) Virtual Machine Specification," Addison Wesley, 1996.

Mitchell et al., "An Overview of the Spring System," Feb. 1994.

Orfali et al., "The Essential Distributed Objects Survival Guide," Chapter 11: Corba Commercial ORBs, pp. 203–215, John Wiley & Sons, Inc., 1996.

Riggs et al., "Picking State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Dave et al., "Proxies, Application Interfaces, and Distributed Systems," XP 002009478, IEEE, 1992, pp. 212–220.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

IBM Technical Disclosure Bulletin, "Local Network Monitoring to Populate Access Agent Directory," vol. 36, No. 09A, pp. 403–405, Sep. 1993.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

* cited by examiner

METHODS AND SYSTEMS FOR
DISTRIBUTED FAILURE DETECTION AND
RECOVERY USING LEASING

RELATED APPLICATIONS

This is a divisional of application Ser. No. 09/044,916, filed Mar. 20, 1998, now U.S. Pat. No. 6,016,500, which was a Continuation-in-Part of Ser. No. 08/729,421, filed Oct. 11, 1996, now U.S. Pat. No. 5,832,529.

Provisional U.S. Patent Application Ser. No. 60/076,048, entitled "Distributed Computing System," filed on Feb. 26, 1998.

U.S. patent application Ser. No. 09/044,923, entitled "Method and System for Leasing Storage," filed on the same date herewith.

U.S. patent application Ser. No. 09/044,838, entitled "Method, Apparatus, and Product for Leasing of Delegation Certificates in a Distributed System," filed on the same date herewith.

U.S. patent application Ser. No. 09/044,834, entitled "Method, Apparatus and Product for Leasing of Group Membership in a Distributed System," filed on the same date herewith.

U.S. patent application Ser. No. 09/044,933, entitled "Method for Transporting Behavior in Event Based System," filed on the same date herewith.

U.S. patent application Ser. No. 09/044,919, entitled "Deferred Reconstruction of Objects and Remote Loading for Event Notification in a Distributed System," filed on the same date herewith.

U.S. patent application Ser. No. 09/044,938, entitled "Methods and Apparatus for Remote Method Invocation," filed on the same date herewith.

U.S. patent application Ser. No. 09/045,652, entitled "Method and System for Deterministic Hashes to Identify Remote Methods," filed on the same date herewith.

U.S. patent application Ser. No. 09/044,790, entitled "Method and Apparatus for Determining Status of Remote Objects in a Distributed System," filed on the same date herewith.

U.S. patent application Ser. No. 09/044,930, entitled "Downloadable Smart Proxies for Performing Processing Associated with a Remote Procedure Call in a Distributed System," filed on the same date herewith.

U.S. patent application Ser. No. 09/044,917, entitled "Suspension and Continuation of Remote Methods," filed on the same date herewith.

U.S. patent application Ser. No. 09/044,835, entitled "Method and System for Multi-Entry and Multi-Template Matching in a Database," filed on the same date herewith.

U.S. patent application Ser. No. 09/044,839, entitled "Method and System for In-Place Modifications in a Database," filed on the same date herewith.

U.S. patent application Ser. No. 09/044,945, entitled "Method and System for Typesafe Attribute Matching in a Database," filed on the same date herewith.

U.S. patent application Ser. No. 09/044,931, entitled "Dynamic Lookup Service in a Distributed System," filed on the same date herewith.

U.S. patent application Ser. No. 09/044,939, entitled "Apparatus and Method for Providing Downloadable Code for Use in Communicating with a Device in a Distributed System," on the same date herewith.

U.S. patent application Ser. No. 09/044,826, entitled "Method and System for Facilitating Access to a Lookup Service," filed on the same date herewith.

U.S. patent application Ser. No. 09/044,932, entitled "Apparatus and Method for Dynamically Verifying Information in a Distributed System," filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," filed on the same date herewith.

U.S. patent application Ser. No. 09/044,934, entitled "Polymorphic Token-Based Control," filed on the same date herewith.

U.S. patent application Ser. No. 09/044,915, entitled "Stack-Based Access Control," filed on the same date herewith.

U.S. patent application Ser. No. 09/044,944, entitled "Stack-Based Security Requirements," filed on the same date herewith.

U.S. patent application Ser. No. 09/044,837, entitled "Per-Method Designation of Security Requirements," and filed on the same date herewith.

BACKGROUND OF THE INVENTION

A. Field of the Invention

This invention generally relates to data processing systems and, more particularly, to leasing for failure detection and recovery in data processing systems.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection." That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back." According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, Digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period, both can know when the lease and, therefore, the guarantee, expires. This guarantees referential integrity for the duration of a reference lease and avoids the concern of failing to free the resource because of network errors.

In an alternative embodiment of the present invention, the leasing technique is used for failure detection and recovery. When using a lease for failure detection, a client requests a lease from a server, and after the lease is granted, the client performs various processing with respect to a resource managed by the server. When the lease is about to expire, the client renews the lease. If for any reason this renew fails, it is because either the server experienced an error or the communication mechanism transferring data between the client and the server experienced an error. In either case, the client has detected an error. Additionally, if the lease expires without the client renewing the lease or explicitly requesting a cancellation of the lease, the server knows that either the client or the communication mechanism experienced an error. In this case, the server has detected an error.

In addition to failure detection, the alternative embodiment also provides for failure recovery. During the establishment of the lease, the client provides the server with a failure recovery routine, and likewise, the server provides the client with a failure recovery routine. Thus, upon detection of a failure, both the client and the server each invoke the failure recovery routine of the other to perform failure recovery for each other. After performing failure recovery, both the client and the server then go to a prenegotiated state. That is, the client and the server, through a negotiation beforehand, have decided upon a state that they will go to upon experiencing an error, such as rolling back all changes made to the resource. As a result, both the client and the server know the state of the system after a failure and can continue processing accordingly.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the Java™ programming language.

In general, whenever an application in the distributed processing system obtains a reference to a distributed resource, by a name lookup, as a return value to some other call, or another method and seeks to access the resource, the application makes a call to the resource or to an MI component managing the resource. That MI component, called a managing MI component, keeps track of the number of outstanding references to the resource. When the number of references to a resource is zero, the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
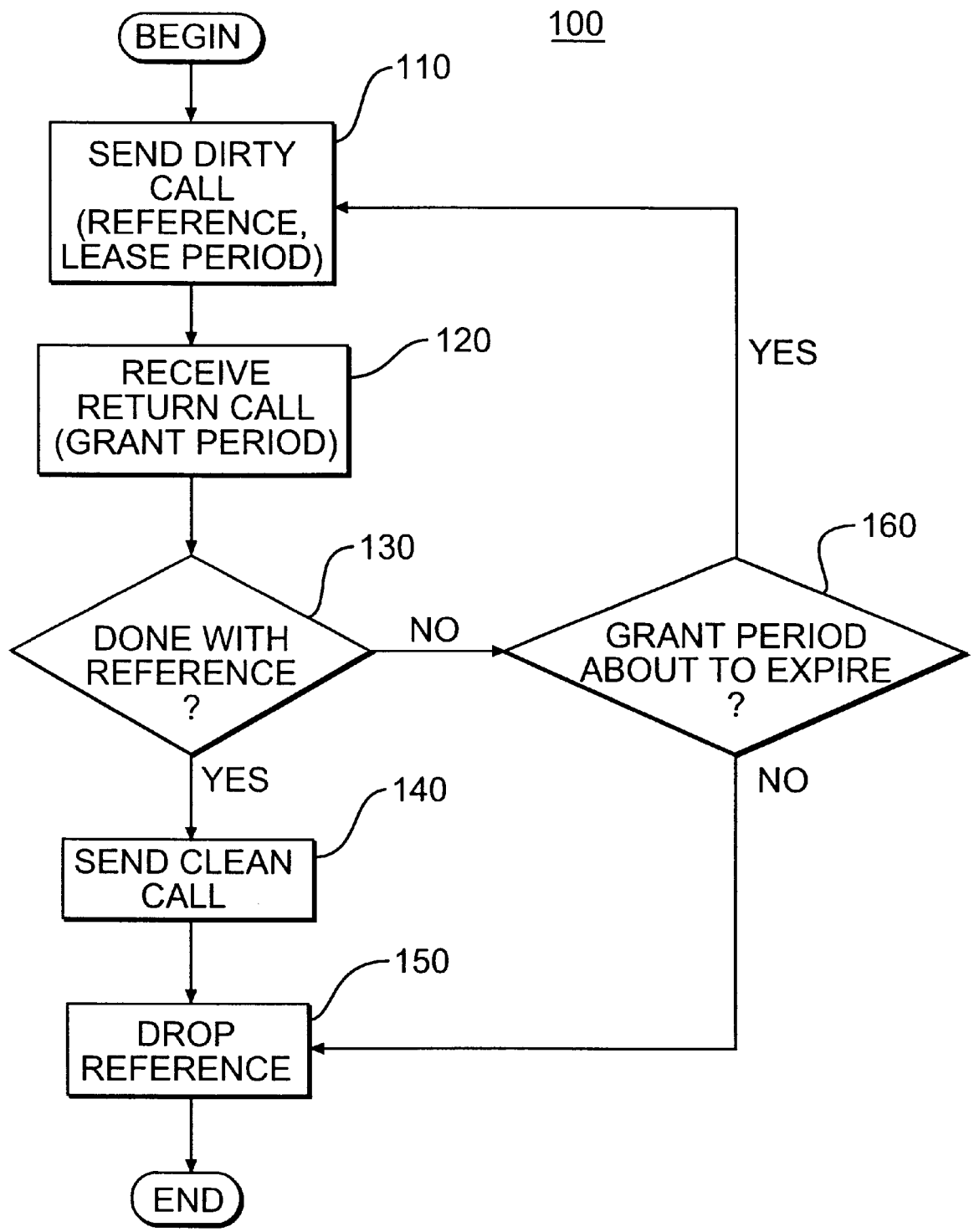
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly, the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and, either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 10 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(I) Dirty Calls

Figure 2:
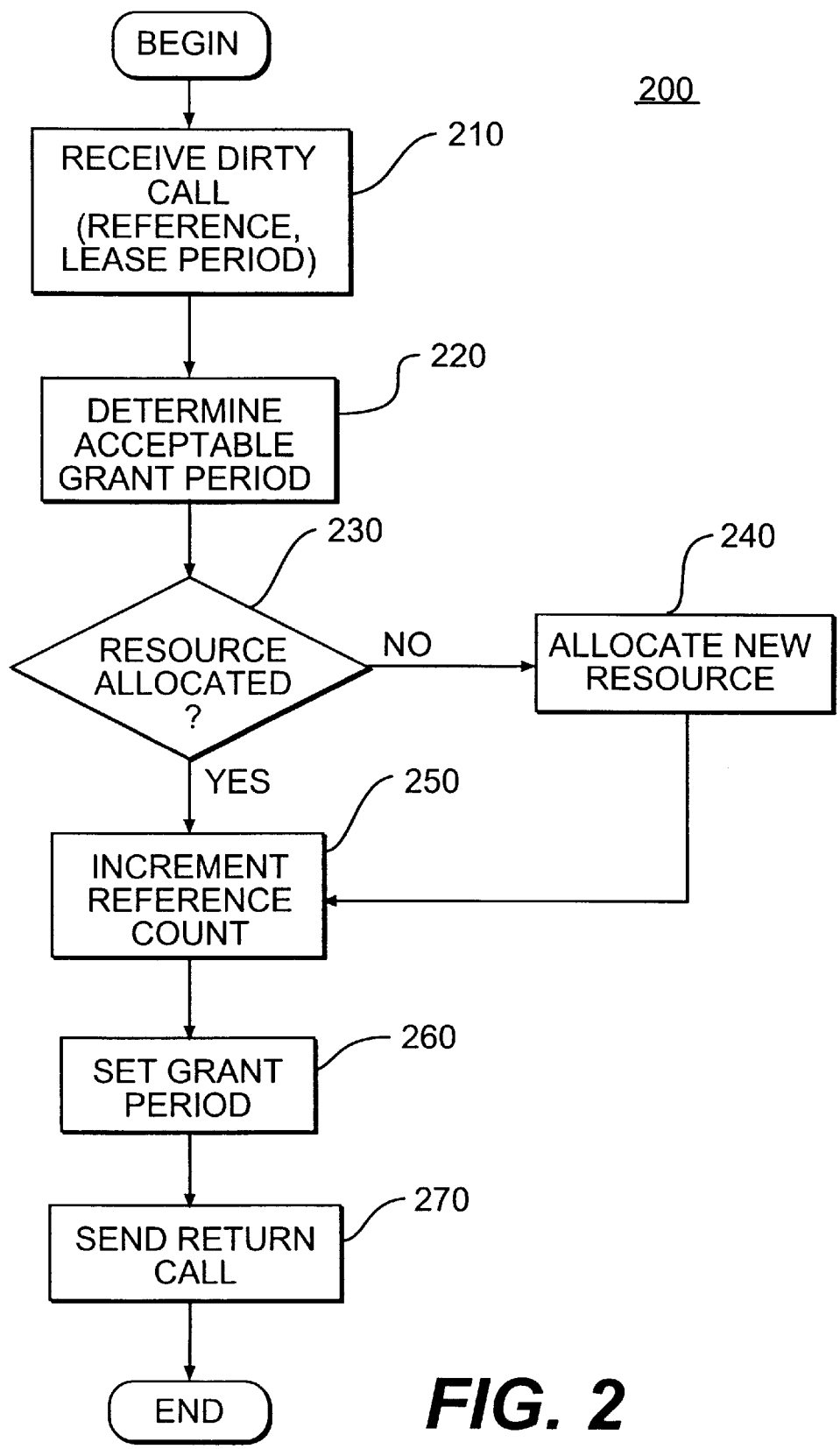
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system, including the application call processor of the same MI component as the server call processor handling requests.

First, the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
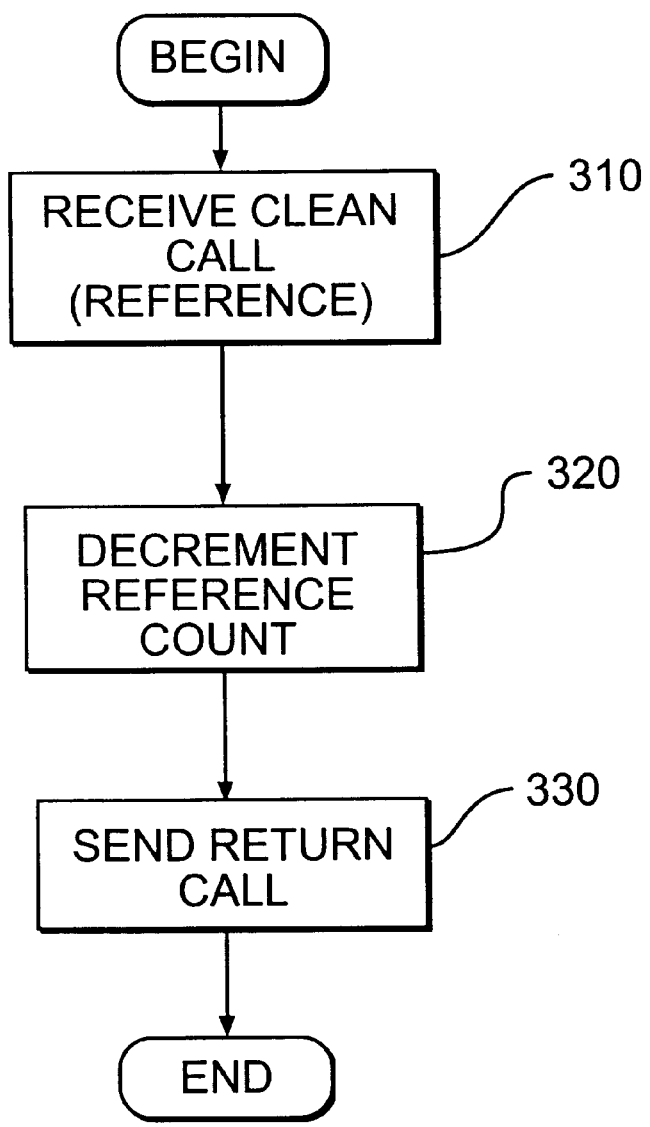
FIG. 3 is a flow diagram of the steps performed by the server call processor to process clean calls according to the implementation of the present invention.
Figure 4:
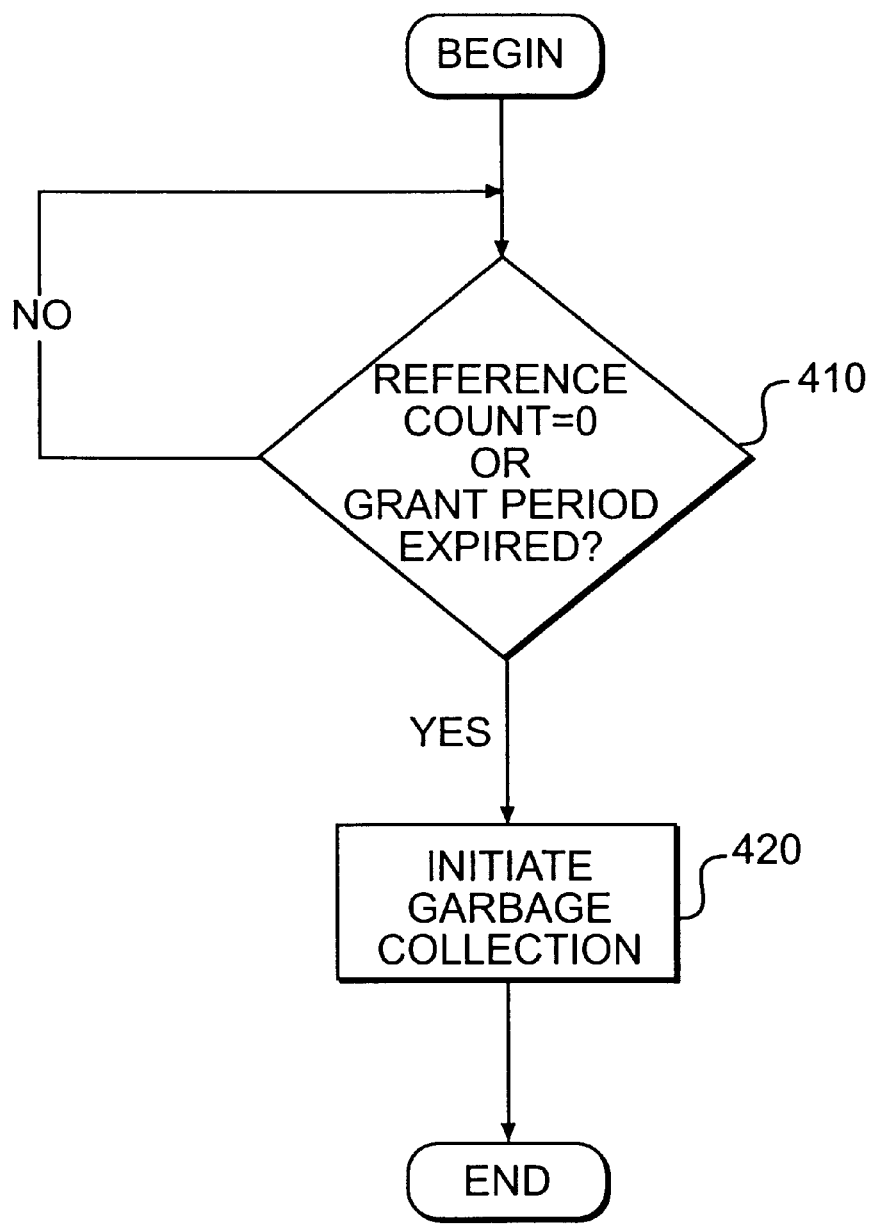
FIG. 4 is a flow diagram of the steps performed by the server call processor to initiate a garbage collection process according to the implementation of the present invention.

The MI component's server call processor also handles incoming clean calls from application call processors. When an application in the distributed processing system no longer requires a reference to a resource, it informs the MI component managing the resource for that reference, so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

The server call processor monitors reference counts and granted lease periods and determines whether a reference count is zero for a resource managed by the MI component, or the grant period for a reference has expired (step 410). When either condition exists, the server call processor initiates garbage collection (step 420) of that resource. Otherwise, the server call processor continues monitoring the reference counts and granted lease periods.

C. Call Flow

Figure 5:
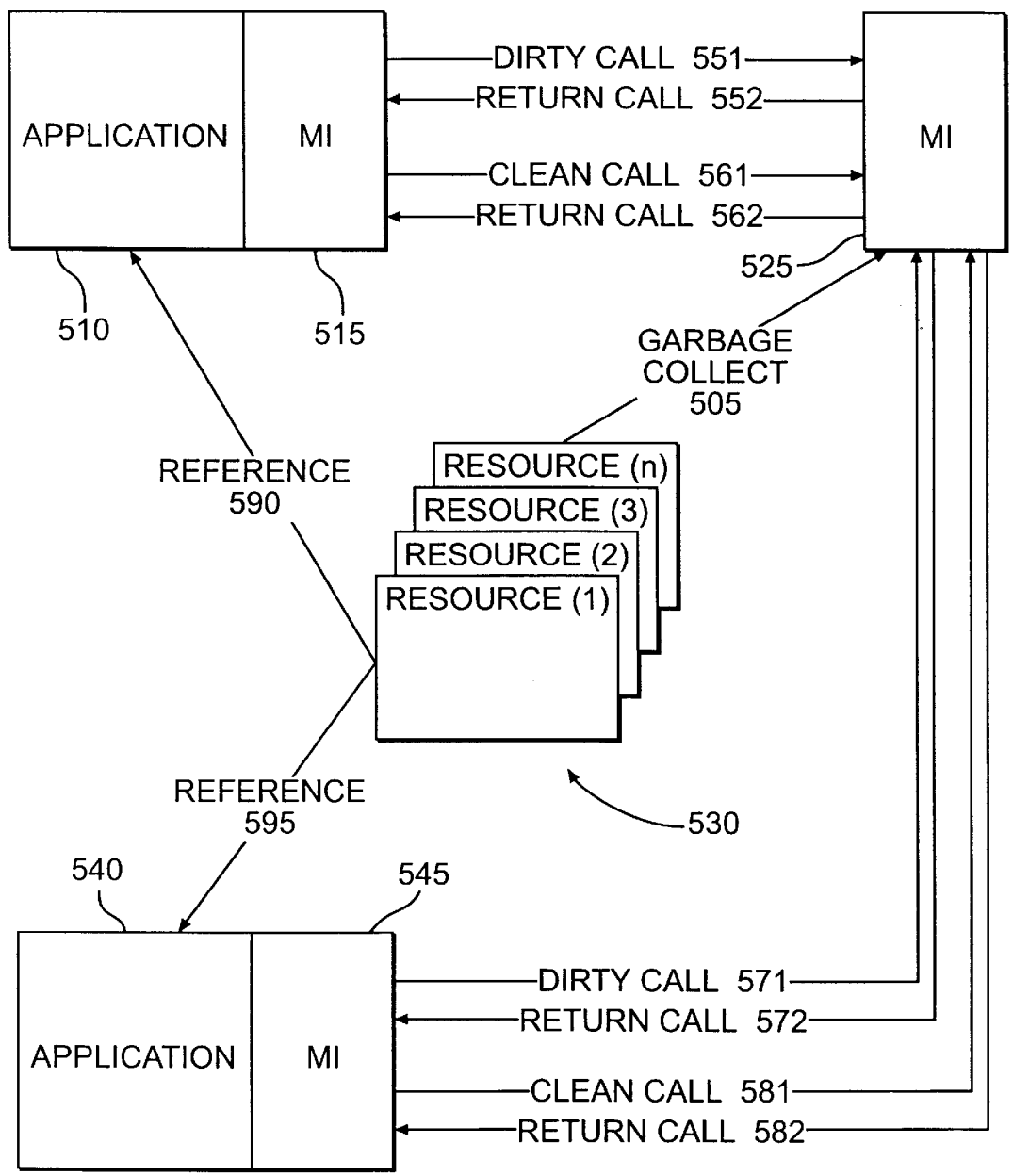
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571, managing MI component 525 sends return calls 552 and 572, respectively, to each of the MI components 515 and 545, respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing MI component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired. whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
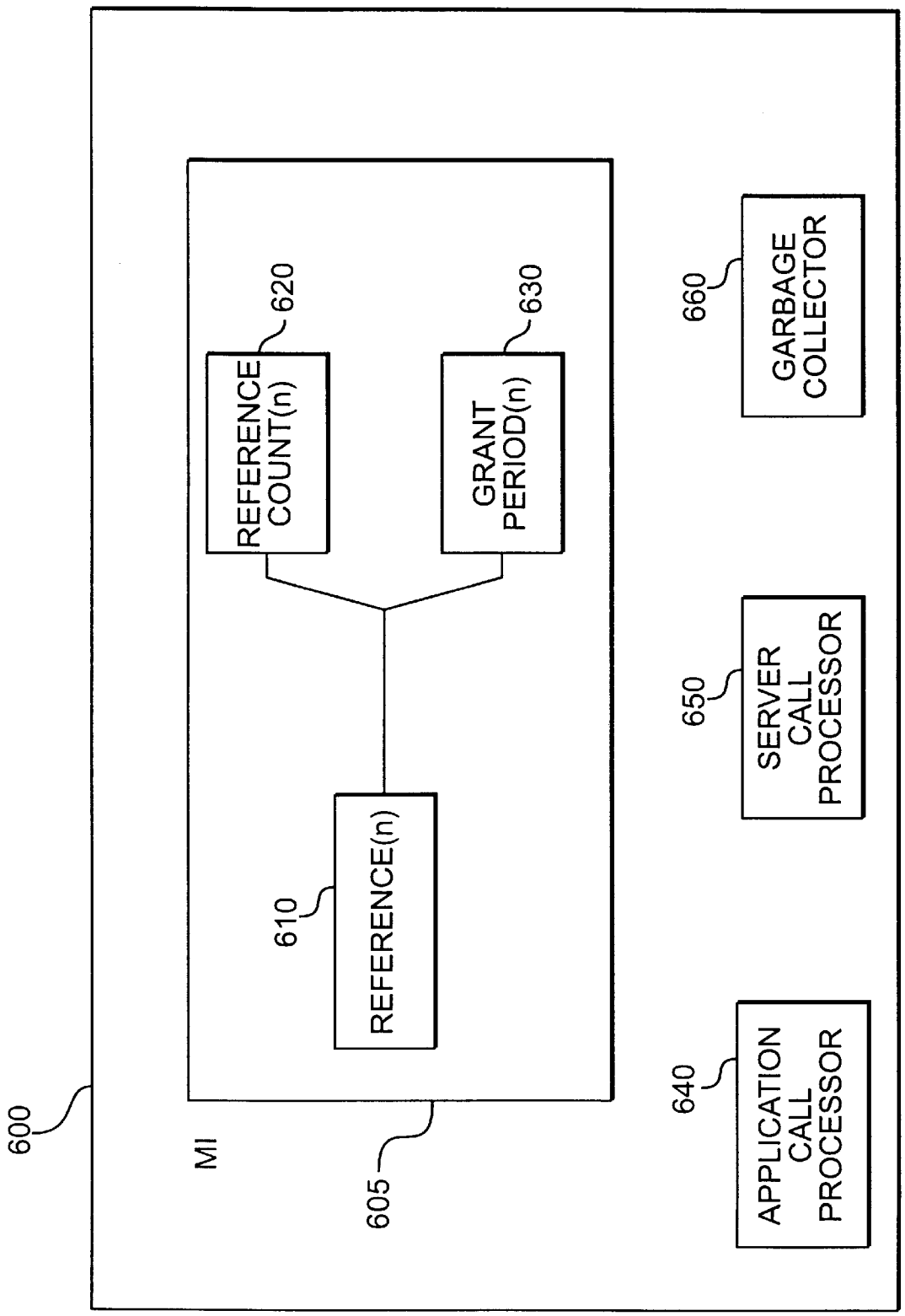
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
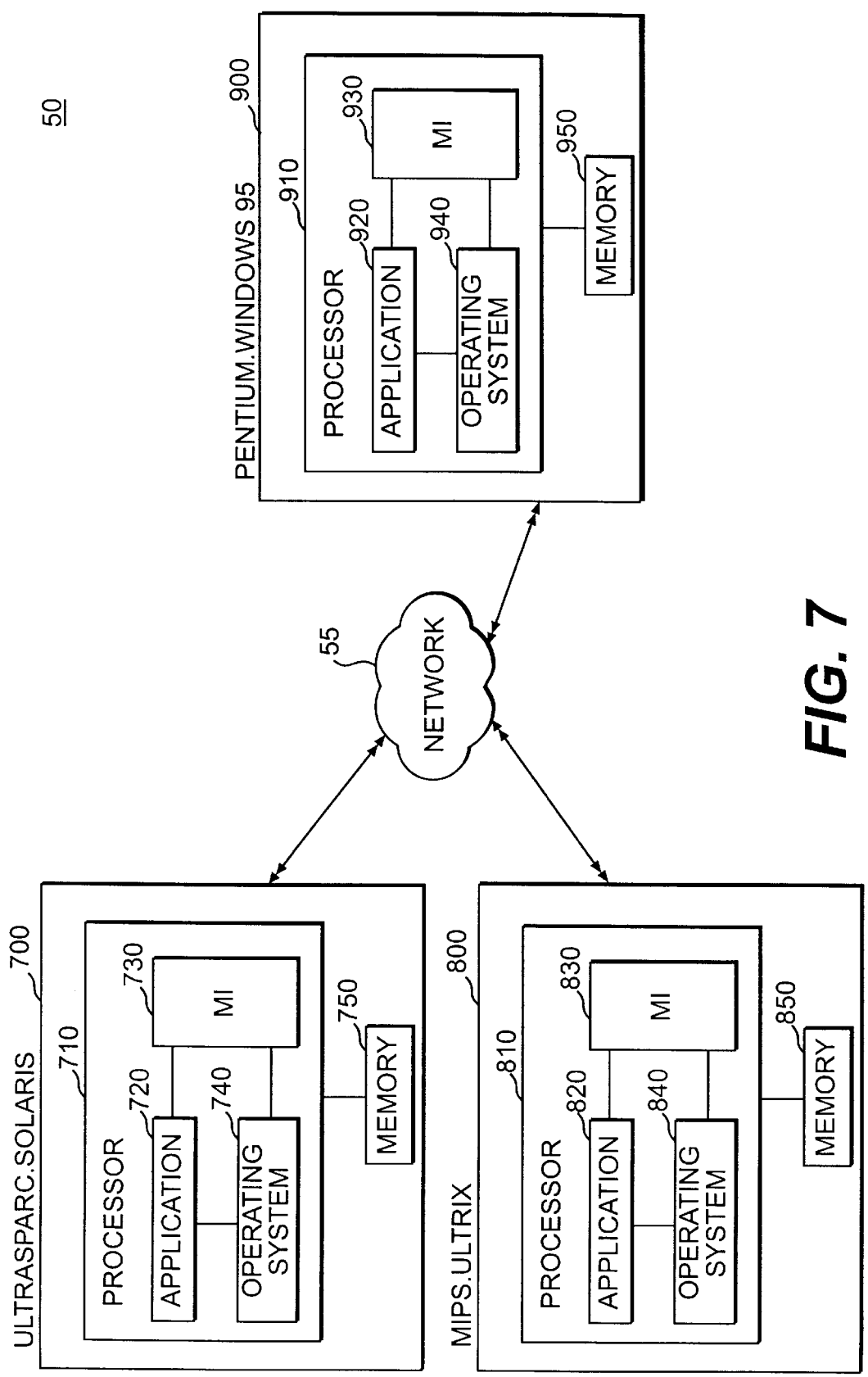
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930. respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910, respectively. The platforms 700, 800, and 900 can be heterogenous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
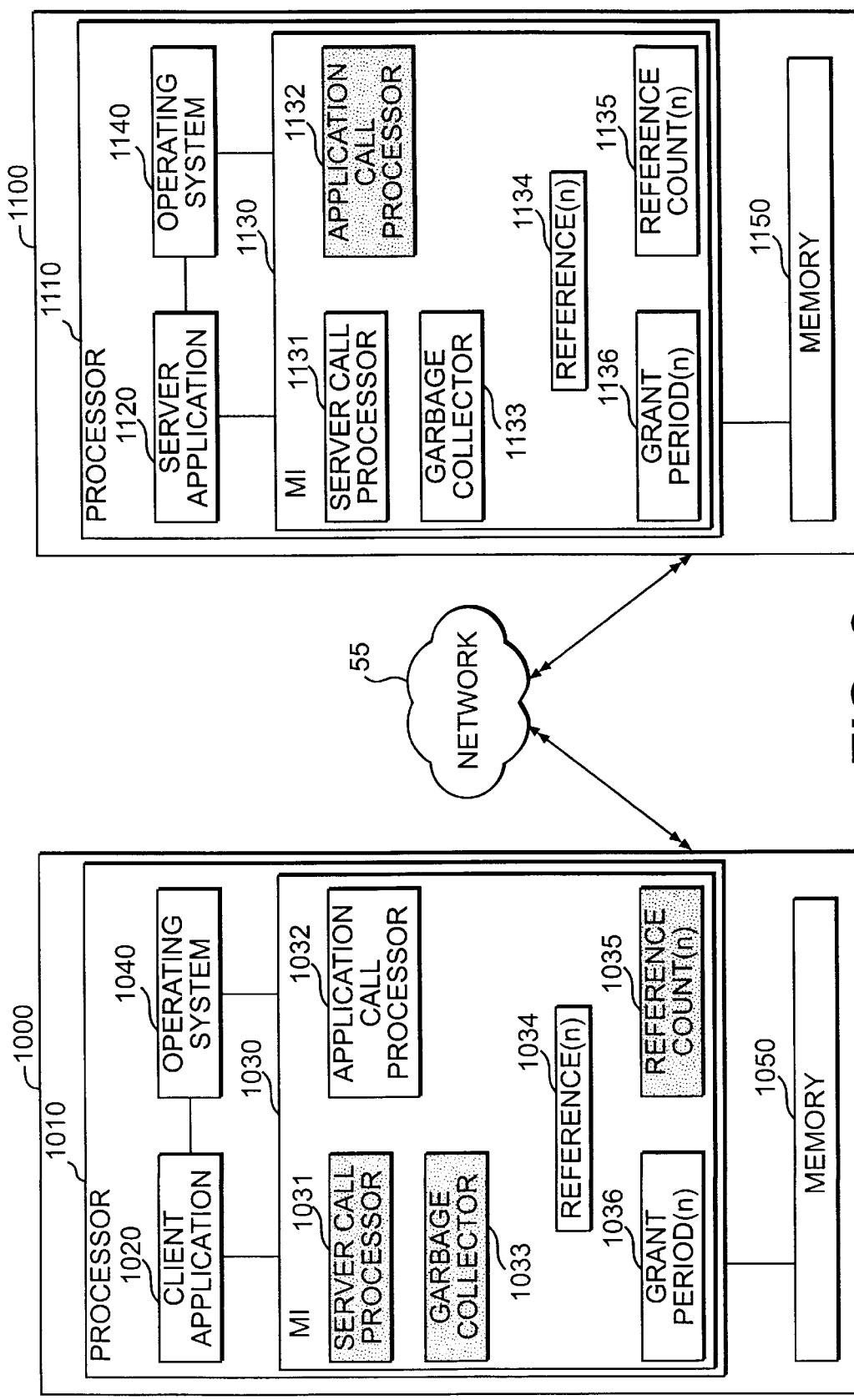
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example. processor 1010 executes a client application 1020 and processor 1110 executes a server application 1120. Processors 1010 and 1110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133, respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 1130 to send dirty calls, which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

Alternative Embodiment

The leasing technique described above relates to garbage collection. However, an alternative embodiment of the present invention can be used with leasing to detect failures and to perform error recovery.

Many systems have been used for detecting failures in client-server environments, like heartbeats or timeouts. Using a heartbeat, a client sends messages at periodic intervals to a server indicating that the client is alive. If at one of the intervals the server does not receive a message, the server knows that a failure has occurred to either the client or the communication mechanism (e.g., the network) that transfers data between the client and the server. Using timeouts, a predetermined amount of time is set and if the server has not received any communication from the client within that time period, the server knows that either the client or the communication mechanism has experienced a failure.

Although these conventional systems adequately indicate when a failure has occurred, both the client and the server can be left not knowing the state of the system after the failure. For example, when the client is a program and the server is a file system manager, the client may request that a write operation be performed on a particular file managed by the server. Although the conventional failure detection systems will detect a failure when one occurs, the client does not know whether the failure occurred before or after the write operation was performed on the file. In this situation, the client cannot determine a state of the system.

An alternative embodiment of the present invention solves this problem by using the leasing technique for failure detection and recovery. When using a lease for failure detection, the client requests a lease from the server and performs various processing with respect to the resource managed by the server during the granted lease period. When the lease is about to expire, the client renews the lease. If for any reason the renew fails, it is because either the server experienced a failure or the communication mechanism experienced a failure. In either case, the client has detected a failure. On the server side, if the lease expires without the client either renewing the lease or performing an explicit cancellation, the server knows that either the client or the communication mechanism experienced a failure, and thus, the server has detected a failure.

Upon detecting a failure, the client and the server perform a recovery by proceeding to a prenegotiated state. That is, the client and the server prenegotiate a state that they will go to upon experiencing or detecting a failure. For instance, in the above file system example, the client and server may prenegotiate to perform a roll back if a failure is detected. A "roll back" refers to putting the client, server, and any related entities, such as the file, in the state they were in before the failure occurred. Thus, in the example, if the server had already performed the write operation, the server restores the file to its state just before the write operation was performed and the client knows that, after the failure is detected, the write operation has not been performed, so the client can continue its processing accordingly.

Alternatively, the client and server may roll back even further. For example, the client and server may prenegotiate that whenever an error occurs during file manipulation, the roll back brings the client and server back to the state they were in before the client had the lease (e.g., before the file was created). Another alternative is that the roll back may instead go back to a predetermined checkpoint in the manipulation of the file. This prenegotiation between the client and server to determine the after-failure system state can be performed in a number of ways, including a handshake, reading a predesignated file, or the client and server may simply be instructed at development time to always go to a given after-failure system state.

In addition, during the establishment of the lease, the client may provide the server with a failure recovery routine, and likewise, the server may provide the client with a failure recovery routine. Thus, upon detection of a failure, both the client and the server invoke each other's failure recovery routine to perform failure recovery. In this situation, if the server has experienced a failure, once the client detects the failure, the client invokes the server's recovery routine which will perform recovery on the server. For example, the recovery routine may restart the server and send a message to the system administrator. Similarly, if the client experiences a failure, the server invokes the client's recovery routine, thus performing failure recovery on the client.

Because the client and server recover each other, system management is performed on a distributed basis. That is, instead of a centralized manager performing system management, like in some conventional systems, by using the leasing technique for failure detection and recovery, the alternative embodiment distributes the system management processing so that clients can perform recovery on a server and so that the server can perform recovery on its clients.

The alternative embodiment can be used in any client-server relationship, including operation in a distributed system where the client and server are located on separate machines communicating via a network or where the client and server are on the same machine. Such a distributed system suitable for use by the alternative embodiment is the exemplary distributed system described in copending U.S. patent application Ser. No. 09/044,931, entitled "Dynamic Lookup Service in a Distributed System," which has been previously incorporated by reference. For purposes of clarity, however, the alternative embodiment will be described below with respect to the server being a file system manager that leases storage locations on a secondary storage device.

Overview of Leasing Storage Locations

Storage devices have many storage locations containing various logical groupings of data that may be used by more than one program. These logical groupings may take the form of files databases, or documents. The leasing of storage locations allows access (e.g., read and write access) to the storage locations for a pre-negotiated amount of time. It is immaterial to the leasing of storage locations what kind of data is contained in the storage locations or whether the storage locations contain any data at all. Also, the leasing of storage locations can be applied on different levels of storage, such as database fields, files, blocks of storage, or actual storage locations.

In a computer system or a distributed system, many programs may compete for files stored in various groups of storage locations. Thus, groups of storage locations may have many programs vying for access. The leasing technique can be used to arbitrate the use of storage locations in such an environment.

When using a lease for a group of storage locations containing the data for a file, a program ("the client") requests a lease from the file system manager ("the server") to access the group of storage locations for a period of time ("the lease period"). Depending on availability, priority, and other factors, the server either denies the request or grants a lease period. The lease period granted may be either the entire lease period requested or some portion of it. Once a client receives a lease, the client may access the group of storage locations for the duration of the lease period.

When requesting a lease period, the client may request an exact lease period. In this situation, the server only grants the lease if the lease period would be the entire lease period requested, as opposed to a portion of it.

While a lease is active, the client is guaranteed access to the group of storage locations and may perform read and write operations on them. And, likewise, the server, during an active lease will maintain the storage locations' integrity. For example, during the lease period, the server will not allow the leased file to be deleted, written over, or otherwise corrupted by any entity other than the client, unless that entity also has a lease. After a lease expires, however, the server no longer guarantees the integrity of the file to the client, and thus, the server may delete the file or otherwise materially change it, or grant a lease to another client that may do the same. Storage locations with no outstanding leases are reclaimed by the server.

Each storage location may have an associated limiting parameter, such as an access parameter or a privilege parameter. The access parameter determines the type of access the server supports for that storage location. For example, a storage location may be defined as read-only access. In this case, the server only allows read access for a subsequently granted lease for that particular storage location. Conversely, an attempt by the client to write to that storage location would not be permitted by the server. Other potential storage location access parameters may include write access, allocation access, re-allocation access, and sub-block access (i.e., for large blocks of storage).

The associated privilege parameter specifies the privilege level the client must have before a lease will be granted. The server may use the privilege parameter to prioritize competing lease requests. In other words, when the server has multiple outstanding lease requests for the same storage location, it may prioritize the requests based on the privilege level of the clients making the request.

The alternative embodiment also supports concurrent access to a group of storage locations by granting multiple, concurrent leases to the same storage locations. For example. if a particular group of storage locations' parameter specifies "read" access, the server can grant multiple concurrent leases to that storage location without breaching the integrity of the storage location. Concurrent leases could also be applied, for example, to large files. The server could merely grant leases to smaller sub-blocks of the file without compromising the integrity of the larger file.

Once the client requests a lease, the server returns to the client an object, including methods for determining the duration of the lease, for renewing the lease, for canceling the lease, and for performing failure recovery. The object is an instance of a class that may be extended in many ways to offer more functionality, but the basic class is defined in the Java programming language as follows:

```
interface Lease {
    obj FileHandle;
    public long getDuration ( );
    public void cancel ( ) throws   UnknownLeaseException,
                                    RemoteException;
    public void renew (long renewDuration) throws
                                    LeaseDeniedException,
                                    UnknownLeaseException,
                                    RemoteException;
    public void recover ( );
}
```

This class contains a number of methods, including the getDuration method, the cancel method, the renew method, and the recover method. The "getDuration" method provides the client with the length of the granted lease period. This period represents the most recent lease granted by the server. It is the client's responsibility however, to determine the amount of time remaining on the lease.

The "renew" method permits the client to renew the lease, asking for more time, without having to re-initiate the original lease request. Situations where the client may desire to renew the lease include when the original lease proves to be insufficient (i.e., the client requires additional use of the storage location), or when only a partial lease (i.e., less than the requested lease) was granted.

The client may use the renew method to request an additional lease period, or the client may continually invoke the renew method multiple times until many additional lease periods are granted. The renew method has no return value. If the renewal is granted, the new lease period will be reflected in the lease object on which the call was made. If the server is unable or unwilling to renew the lease, the reason is set forth in the lease object on which the call was made.

The client invokes the "cancel" method when the client wishes to cancel the lease. Thus, invocation of the cancel method allows the server to re-claim the storage locations so that other programs may access them. Accordingly, the cancel method ensures that the server can optimize the use of the storage locations in the distributed system. It should be noted that if the lease expires without an explicit cancellation by the client, the server assumes an error occurred.

The "recover" method is provided by the server so that the client can perform failure recovery on the server. For example, such error recovery may include restarting the server.

The leasing of storage locations is described in greater detail in co-pending U.S. patent application Ser. No. 09/044, 923, entitled "Method and System for Leasing Storage" which has previously been incorporated by reference.

Implementation Details

Figure 9:
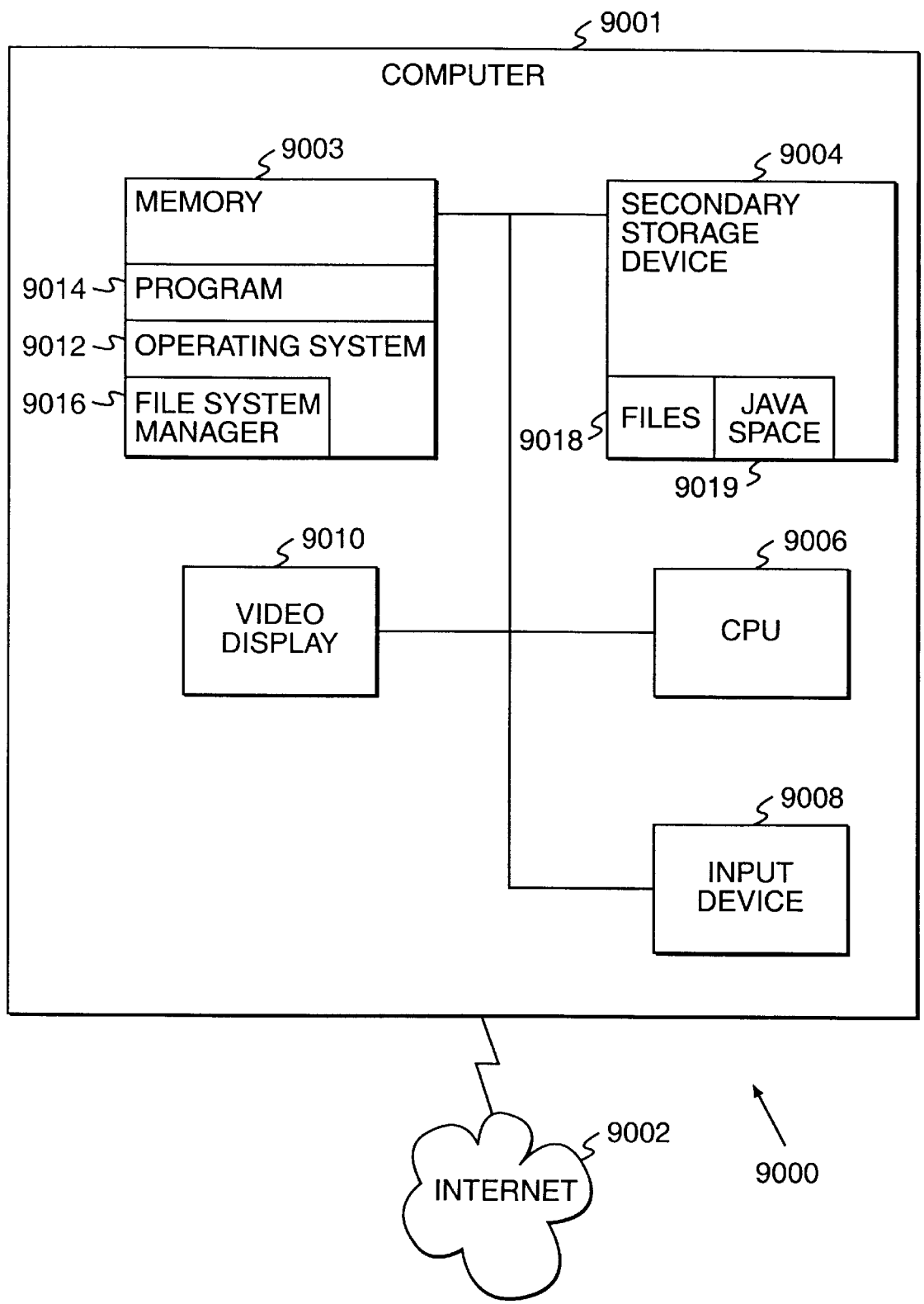
FIG. 9 is a diagram of a data processing system suitable for use with an alternative embodiment of the present invention.

FIG. 9 depicts a data processing system 9000 suitable for use by an alternative embodiment of the present invention. The data processing system 9000 includes a computer system 9001 connected to the Internet 9002. The computer system 9001 includes a memory 9003, a secondary storage device 9004, a central processing unit (CPU) 9006, an input device 9008, and a video display 9010. The memory 9003 further includes an operating system 9012 and a program 9014, the client. The operating system 9012 contains a file system manager 9016, the server, that manages files 9018 on the secondary storage device 9004. The secondary storage device 9004 also includes a Java™ space 9019. The client 9014 requests access to one or more of the files 9018 by requesting a lease from the server 9016. In response, the server 9016 may either choose to grant or deny the lease as further described below.

The Java space 9019 is an object repository used by programs within the data processing system 9000 to store objects. Programs use the Java space 9019 to store objects persistently as well as to make them accessible to other devices on the network. Java spaces are described in greater detail in co-pending U.S. patent application Ser. No. 08/971, 529, entitled "Database System Employing Polymorphic Entry and Entry Matching," assigned to a common assignee, filed on Nov. 17, 1997, which is incorporated herein by reference. One skilled in the art will appreciate that computer 9000 may contain additional or different components.

Although aspects of the alternative embodiment are described as being stored in memory 9003, one skilled in the art will appreciate that these aspects may also be stored on or read from other computer-readable media, such as secondary storage devices, like hard disks, floppy disks, or CD-Rom; a carrier wave from the Internet 9002; or other forms of RAM or ROM. Additionally, one skilled in the art will appreciate that the alternative embodiment can be used to lease other forms of data in secondary storage, like databases, spreadsheets, and documents.

Figure 10:
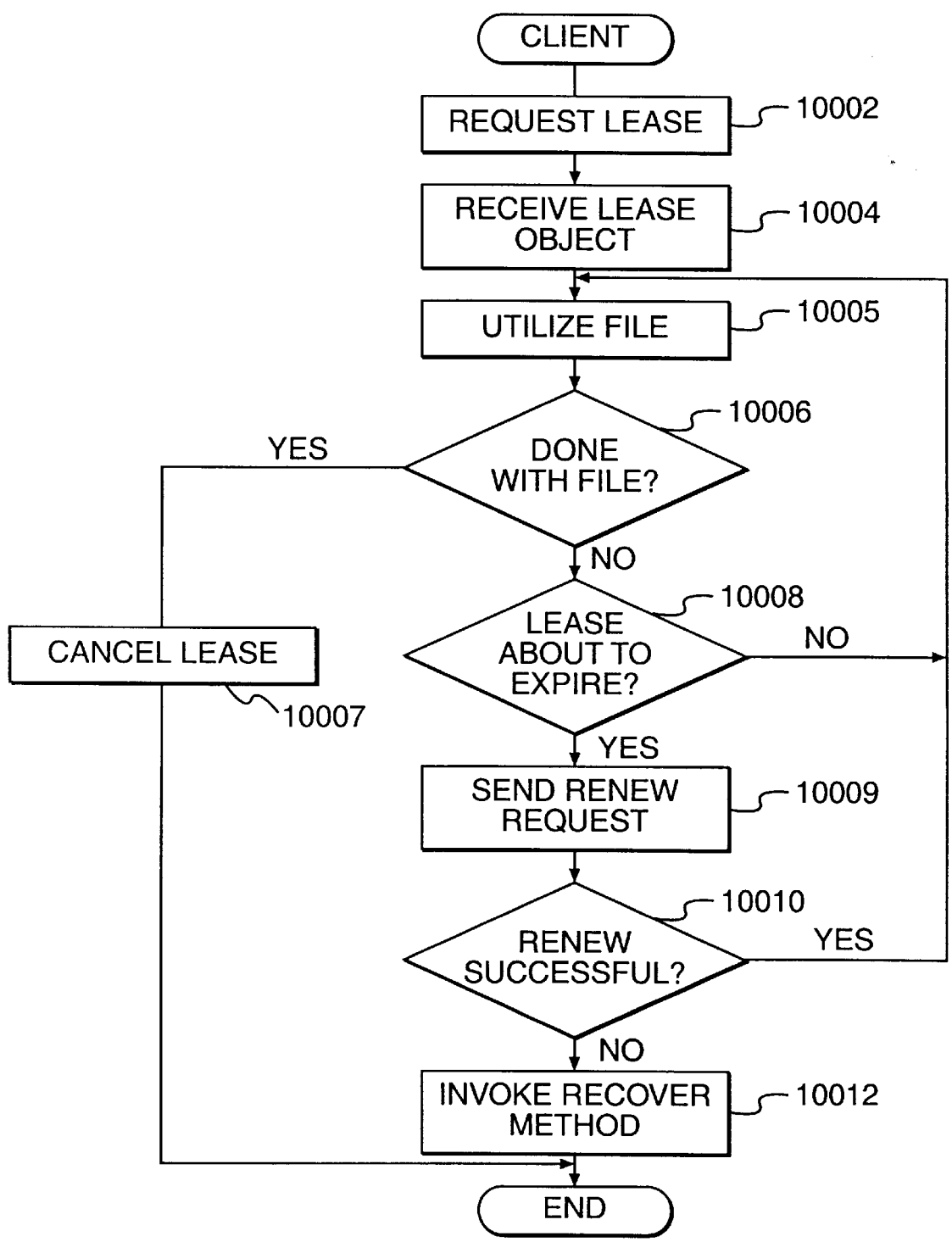
FIG. 10 depicts a flowchart of the steps performed by a client when requesting a lease from a server consistent with an alternative embodiment of the present invention.

FIG. 10 depicts a flowchart of the steps performed by the client when requesting a lease from the server. The first step performed by the client is to send a request for a lease to the server (step 10002). This request is a function call with a number of parameters, including (1) the requested storage locations the client wishes to lease, (2) the desired lease period, (3) an exact lease indicator, (4) the type of access the client desires, (5) the client's privilege, and (6) an object containing a recover method. This method contains code for performing error recovery for the client.

The requested storage locations is an indication of the storage locations to be leased. The desired lease period contains an amount of time for which the client wants to utilize the storage locations. The exact lease request contains an indication of whether an exact lease request is being made or whether a lease of less than the requested amount will suffice. The type of access requested indicates the type of storage location access the client requested. The types of access include read access, write access, allocation access, re-allocation access, and sub-block access (i.e., for large blocks of storage). The privilege field indicates the privilege level of the user or the client. To form a valid request, the client request must contain both the requested storage location and the desired lease period.

There are two general scenarios that generate a lease request for storage locations. The first scenario occurs when a file is created. A "create" command is used to create the file and also generates a lease request to the server for access to the file. The second scenario occurs when a client desires access to either existing storage locations or a file already having an existing lease (i.e., in the case of concurrent leases).

After sending the request, the client receives a lease object from the server (step 10004). The lease object contains various information, as described above, including the file handle, the getDuration method, the renew method, the cancel method, and the recover method.

After receiving the lease object, the client utilizes the file (step 10005). Next, the client determines if it has completed its use of the file (step 10006). If so, the client invokes the cancel method on the lease object to explicitly cancel the lease (step 10007). By invoking this method, the lease is canceled by the server without the server believing that a failure occurred.

If the client has not completed its use of the file, the client determines if the lease is about to expire (step 10008). The client performs this step by invoking the getDuration method and determining whether the remaining time is within a predetermined threshold. If the lease is not about to expire, processing continues to step 10005. However, if the lease is about to expire, the client sends a renew request to the server (step 10009). In this step, the client invokes the renew method on the lease object. After invoking the renew method, the client determines if the renew request was successful (step 10010). In this step, the client determines if the renew request was successful by whether the renew method returned successfully. If so, processing continues to step 10005. However, if the renew method did not complete successfully, the client invokes the recover method on the lease object (step 10012). Because the renew request did not complete successfully, the client knows that a failure occurred and thus needs to perform error recovery by invoking the recover method. The recover method then performs recovery on the server.

Figure 11:
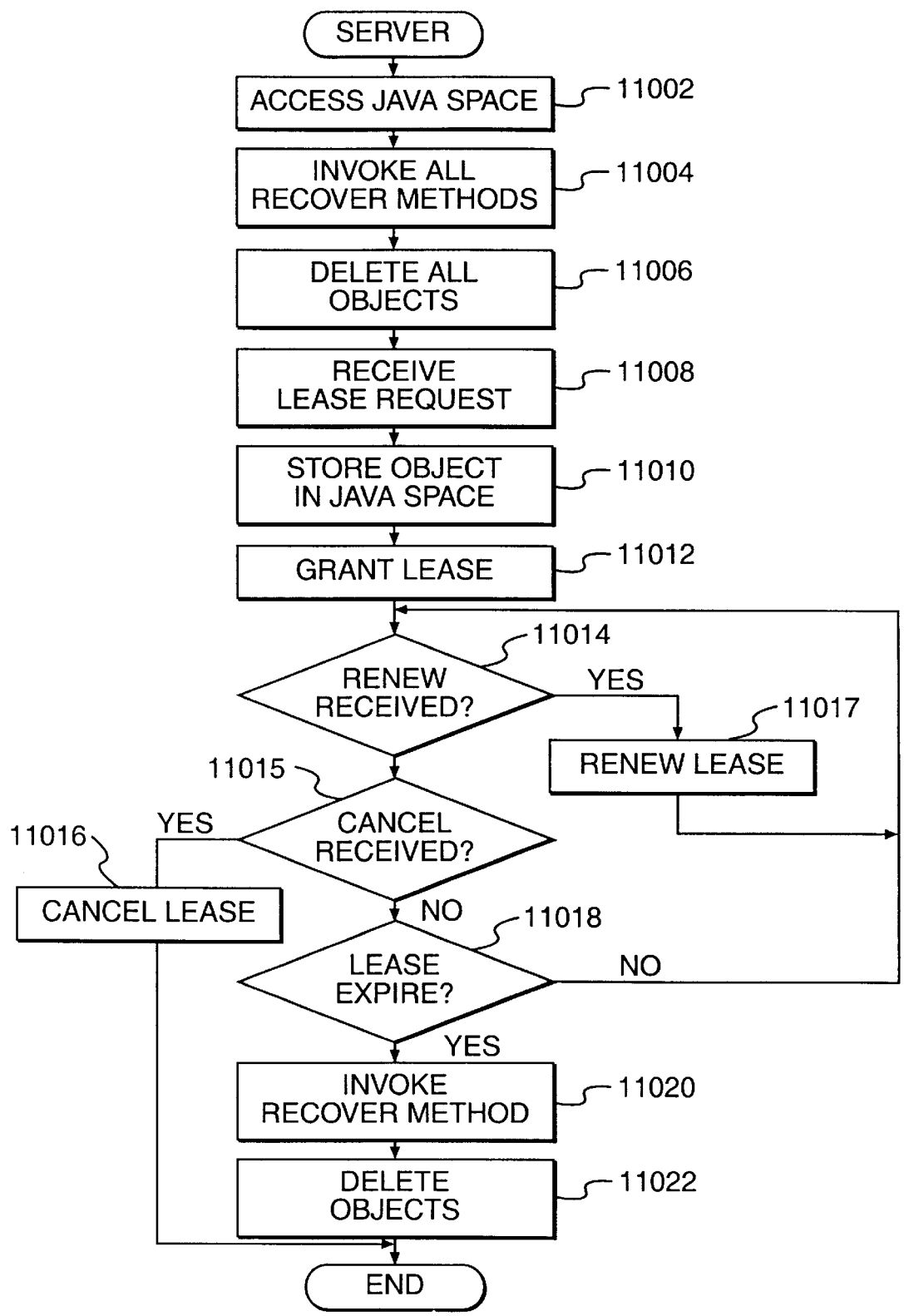
FIG. 11 depicts a flowchart of the steps performed by a server when a client requests a lease consistent with an alternative embodiment of the present invention.

FIG. 11 depicts a flowchart of the steps performed by the server in accordance with an alternative embodiment of the present invention. The first step performed by the server is to access the Java space 9019 (step 11002). The server maintains a Java space in which it stores all objects received during a lease request. These objects are stored in the Java space so that if the server detects a failure, it may access the Java space and perform recovery by invoking the recover methods on the objects. Furthermore, the objects are stored persistently so if the server experiences a failure and crashes, when the server is restarted, it may invoke the recover method on each object in the Java space, reflecting all of the outstanding leases at the time of the server failure. In step 11002, the server accesses the Java space containing all objects, if any, received from clients as part of lease requests. If there are any objects in the Java space, a failure must have occurred during the processing of the server.

Next, the server invokes the recover method on each of the objects in the Java space (step 11004). In this step, if there are objects in the Java space, it indicates that the server terminated processing due to a failure and must perform recovery. The server performs this recovery by invoking the recover method for each client that had a lease. These recover methods may, for example, restart the clients and return them to a prenegotiated state, like the state they were in before requesting the lease. After invoking all recover methods, the server deletes all of the objects from the Java space (step 11006). After a recovery has been performed, the objects are no longer needed.

After deleting the objects, the server receives a lease request from one of the clients (step 11008). After receiving the lease request, the server stores the object received in this request into the Java space (step 11010). By storing the object in the Java space, which stores objects persistently, if a failure occurs, the server can access the Java space and invoke the recover method on the object to perform error recovery for the client.

After storing the object in the Java space, the server grants the lease request by returning an object with the methods described above, including a recover method for the server (step 11012). At some point later in the processing of the server, the server determines whether it has received a renew request from the client (step 11014). If the renew request has been received the server renews the lease (step 11017). If, however, a renew has not been received, the server determines if a cancel request has been received by the client invoking the cancel method (step 11015). If the client invoked the cancel method, the server cancels the lease by deleting the object stored in step 11010 from the Java space, and if this is the last outstanding lease on the file, the server deletes the file (step 11016).

If a cancel request was not received, the server determines if the lease has expired (step 11018). If the lease has not expired, processing continues to step 11014. However, if the lease has expired, the server knows that a failure has occurred and therefore invokes the recover method on the object in the Java space for the client with the lease that terminated (step 11020). After invoking the recover method the server deletes this object because it is no longer needed (step 11022).

Although methods and systems consistent with the present invention have been described with reference to a preferred embodiment thereof, those skilled in the art will know of various changes in form and detail which may be made without departing from the spirit and scope of the claimed invention as defined in the appended claims.

What is claimed is:

1. A method for recovering from failures in a distributed system that includes a client and a server, said method comprising the steps of:

requesting by the client a lease from the server for using a resource managed by the server;

granting the lease by the server to the client for a period of time; and detecting by the client a first failure when a request to renew the granted lease fails.

2. The method of claim 1, further comprising the steps of:

detecting by the server a second failure when the granted lease expires.

3. The method of claim 2, further comprising the step of:

recovering the client by rolling back the client and the resource to a prenegotiated state.

4. The method of claim 3, wherein the recovering step includes the step of:

invoking a method provided by the client to the server for recovering the client and the resource.

5. The method of claim 1, further comprising the step of:

recovering the server by rolling back the server and the resource to a prenegotiated state.

6. The method of claim 5, wherein the recovering step includes the step of:

invoking a method provided by the server to the client for recovering the server and the resource.

7. The method of claim 1, wherein the requesting step includes the step of:

sending to the server a request that includes a resource identifier and the period of time.

8. The method of claim 1, wherein the requesting step includes the step of:

sending to the server a request that includes a type of access to the resource requested by the client.

9. The method of claim 1, wherein the requesting step includes the step of:
sending to the server a request that includes a privilege level associated with the client.

10. The method of claim 1, wherein the requesting step includes the step of:
sending to the server an object that includes a method for recovering the client.

11. The method of claim 1, wherein the granting step includes the step of:
sending to the client an object that includes a method for recovering the server.

12. The method of claim 1, wherein the granting step includes the step of:
sending to the client an object that includes a method for renewing the lease.

13. The method of claim 1, wherein the granting step includes the step of:
sending to the client an object that includes a method for canceling the lease.

14. The method of claim 1, wherein the granting step includes the step of:
sending to the client an object that includes a method for determining the period of time of the lease.

15. A data processing system, comprising:
a memory including:
a client program containing a first code that requests a lease for using a resource and containing second code that detects a first failure when a request by the client program to extend the lease fails; and
a server program containing third code that manages the resource, containing fourth code that grants the lease to the client program for a period of time, and containing fifth code that detects a second failure when the lease expires; and
a processor for running the client program and the server program.

16. The data processing system of claim 15, wherein the client program includes sixth code that recovers the server program by rolling back the server program and the resource to a prenegotiated state when the client program detects the first failure.

17. The data processing system of claim 15, wherein the server program includes seventh code that recovers the client program by rolling back the client program and the resource to a prenegotiated state when the server program detects the second failure.

18. The data processing system of claim 15, further comprising:
a storage device including a first object generated by the client program when requesting the lease from the server program.

19. The data processing system of claim 18, wherein the first object includes a method for recovering the client program by the server program.

20. The data processing system of claim 15, further comprising:
a storage device including a second object generated by the server program when granting the lease to the client program.

21. The data processing system of claim 20, wherein the second object includes a method for recovering the server program by the client program.

22. The data processing system of claim 20, wherein the second object includes a method for extending the lease by the client program.

23. The data processing system of claim 20, wherein the second object includes a method for canceling the lease by the client program.

24. A computer-readable medium containing instructions for controlling a data processing system to perform a method, the data processing system including a client and a server, said method comprising the steps of:
requesting by the client a lease from the server for using a resource managed by the server;
generating by the server a lease object that grants the lease to the client;
detecting by the client a first failure when a request by the client to renew the lease fails; and
detecting by the server a second failure when the granted lease expires before receiving from the client a request to cancel the lease.

25. The computer-readable medium of claim 24, wherein said method further comprises the step of:
recovering the server by invoking a recovery routine in the lease object by the client.

26. The computer-readable medium of claim 25, wherein said recovering step includes the step of:
recovering the server by rolling back the server and the resource by the client to a prenegotiated state.

27. The computer-readable medium of claim 24, wherein said method further comprises the step of:
recovering the client by invoking a recovery routine provided to the server by the client when the client requested the lease.

28. The computer-readable medium of claim 27, wherein said recovering step includes the step of:
recovering the client by rolling back the client and the resource by the server to a prenegotiated state.

29. An apparatus for recovering from failures in a distributed system, comprising:
a requesting means for requesting a lease for using a resource and for detecting a first failure when a request by the requesting means to renew the lease fails; and
a resource allocating means for granting the lease to the client program for a period of time and for detecting a second failure when the lease expires before receiving from the requesting means a request to cancel the lease.

30. A method for recovering from failures in a distributed system that includes a client and a server, said method comprising the steps of:
requesting by the client a lease from the server for using a resource managed by the server for a period of time;
receiving by the client from the server a first object that grants the lease to the client and includes a method for recovering the server;
sending by the client to the server a request to renew the granted lease; and
detecting by the client a first failure when the request to renew the granted lease fails.

31. The method of claim 30, further comprising the step of:
recovering the server by invoking the recovery method in the first object by the client.

32. The method of claim 30, wherein the requesting step comprises the step of:
sending to the server a second object that includes a recovery method for recovering the client when the server detects that the lease has expired before receiving from the client a request to cancel the lease.

33. A method for recovering from failures in a distributed system including a client and a server, said method comprising the steps of:

receiving by the server a request from the client for a lease for using a resource managed by the server;

granting the lease to the client for a period of time by sending to the client a first object that includes a method for recovering the server; and detecting by the server a failure when the granted lease expires.

34. The method of claim 33, wherein the receiving step includes the step of:

receiving a second object that includes a method for recovering the client by the server.

35. The method of claim 33, wherein the detecting step includes the step of:

detecting by the server a failure when the granted lease expires before receiving from the client a request to cancel the granted lease.

36. The method of claim 33, wherein the detecting step includes the step of:

detecting by the server a failure when the granted lease expires before receiving from the client a request to renew the granted lease.

37. A computer-readable memory device encoded with a data structure for recovering from failures in a distributed system including a client and a server, the data structure comprising:

an object including an identifier identifying a resource leased by the client from the server and a recovery method for recovering the server and the resource by the client when a request by the client to renew the lease fails.

38. The computer-readable memory device of claim 37, further comprising:

a renewing method for renewing the granted lease when the client determines that the lease is near expiration.

39. The computer-readable memory device of claim 37, further comprising:

a canceling method for canceling the granted lease when the client completes use of the resource.

40. The computer-readable memory device of claim 37, further comprising:

a duration method for determining the period of time of the granted lease.

41. A computer-readable memory device encoded with a data structure for recovering from failures in a distributed system including a client and a server, the data structure comprising:

an identifier identifying a resource leased by the client from the server for a period of time; and an object including a recovery method for recovering the client and the resource by the server when the lease expires.

42. The computer-readable memory device of claim 41, wherein the recovery method recovers the client and the resource when the lease expires before the server receives a request from the client to cancel the lease.

43. The computer-readable memory device of claim 41, wherein the recovery method recovers the client and the resource when the lease expires before the server receives a request from the client to renew the lease.

44. The computer-readable memory device of claim 43, further comprising:

a type of access to the resource requested by the client.

45. The computer-readable memory device of claim 43, further comprising:

a privilege level associated with the client.

46. A method for recovering from failures in a distributed system that includes a client and a server, said method comprising the steps of:

exchanging code between the client and the server during a lease negotiation for using a resource managed by the server; and invoking the code to perform system management.

47. The method of claim 46, wherein the invoking step includes the step of:

recovering the client by the server when the server detects a failure.

48. The method of claim 46, wherein the invoking step includes the step of:

recovering the client and the resource by the server when the server detects a failure.

49. The method of claim 46, wherein the invoking step includes the step of:

recovering the server by the client when the client detects a failure.

50. The method of claim 46, wherein the invoking step includes the step of:

recovering the server and the resource by the client when the client detects a failure.

* * * * *